(12) United States Patent
Harrison

(10) Patent No.: US 6,610,160 B2
(45) Date of Patent: Aug. 26, 2003

(54) METHOD FOR RESURFACING A CEILING TILE

(76) Inventor: Donald W. Harrison, 18616 W. 59th, Golden, CO (US) 80403

( * ) Notice: Subject to any disclaimer, the term of this patent is extended or adjusted under 35 U.S.C. 154(b) by 152 days.

(21) Appl. No.: 09/727,084

(22) Filed: Nov. 29, 2000

(65) Prior Publication Data

US 2002/0096243 A1 Jul. 25, 2002

(51) Int. Cl.⁷ ................................ B32B 25/00
(52) U.S. Cl. .................. 156/94; 156/213; 156/286
(58) Field of Search .................. 156/94, 98, 213, 156/285, 286; 428/63; 181/291; 52/514

(56) References Cited

U.S. PATENT DOCUMENTS

| | | | |
|---|---|---|---|
| 3,149,018 A | * 9/1964 | Jacobsen | 156/213 |
| 3,398,811 A | 8/1968 | Muller | |
| 3,551,232 A | 12/1970 | Thompson | |
| 3,782,495 A | * 1/1974 | Nassof | 181/284 |
| 3,912,542 A | 10/1975 | Hirano et al. | |
| 4,553,631 A | * 11/1985 | Panza | 181/286 |
| 4,666,540 A | 5/1987 | Halls | |
| 4,894,102 A | * 1/1990 | Halls et al. | 156/212 |
| 5,080,742 A | 1/1992 | Takahashi | |
| 5,123,985 A | 6/1992 | Evans et al. | |
| 5,277,743 A | 1/1994 | Copeland | |
| 5,824,973 A | * 10/1998 | Haines et al. | 181/286 |
| 6,007,650 A | 12/1999 | Itoyama et al. | |

* cited by examiner

*Primary Examiner*—Michael W. Ball
*Assistant Examiner*—John L. Goff
(74) *Attorney, Agent, or Firm*—Dorr, Carson, Sloan & Birney, P.C.

(57) ABSTRACT

A method for encasing a ceiling tile. The back surface of the ceiling tile is positioned adjacent to a vacuum table and a facing is placed over the front surface of the ceiling tile so that the facing overlaps each edge about the perimeter of the ceiling tile. In one embodiment, the facing is covered with an air-impermeable cover and a support frame can be placed surrounding the perimeter of the ceiling tile. The facing is drawn onto the ceiling tile by a vacuum applied through the vacuum table. The ceiling tile is then reversed so that the front surface of the ceiling tile is positioned adjacent to the vacuum table. An air-impermeable backing is placed over the ceiling tile so that the backing overlaps each edge about the perimeter of the ceiling tile. The backing is drawn onto the ceiling tile by the vacuum applied through the vacuum table. As a result, the ceiling tile is encased between the facing and the backing, and a flap formed by the backing adhering to the facing seals the perimeter of the ceiling tile.

3 Claims, 2 Drawing Sheets

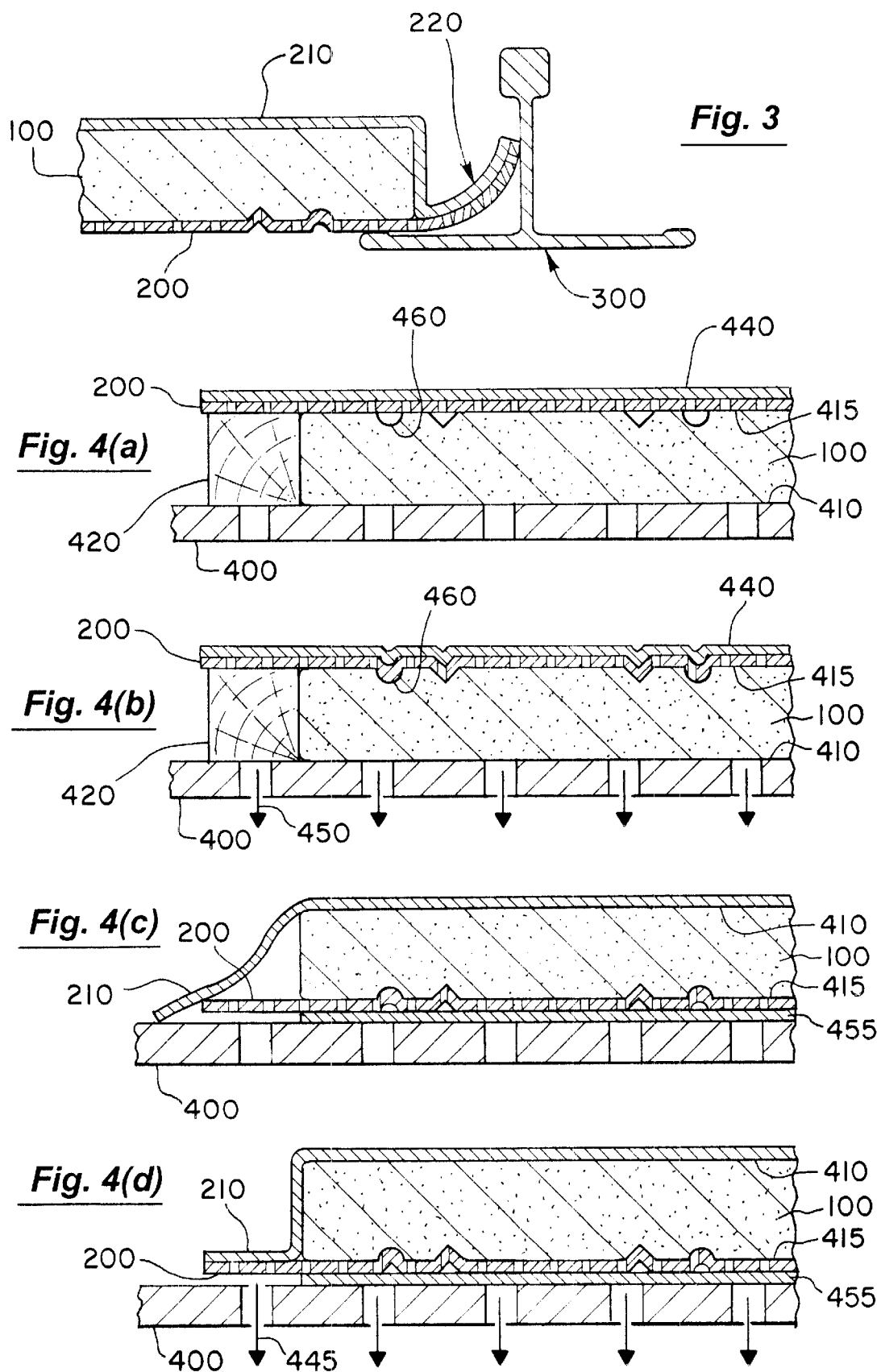

METHOD FOR RESURFACING A CEILING TILE

BACKGROUND OF THE INVENTION

1. Field of the Invention

The present invention relates generally to the field of ceiling tiles. More specifically, the present invention discloses a method for resurfacing a ceiling tile.

2. Statement of the Problem

False ceilings are used in many buildings throughout the world. False ceilings are relatively inexpensive, easy to install, and once installed, provide convenient access to wiring and plumbing in the ceiling infrastructure. However, the ceiling tiles used with false ceilings are easily stained by water leaks, dust, and air pollution in the building. Therefore, a need exists to resurface old ceiling tiles. In addition, some ceiling tiles break during the manufacturing process and during installation. Therefore, another need exists to repair broken ceiling tiles. In addition, dust and other debris tends to accumulate on the top or back surface of the ceiling tiles. If the ceiling tile is not cleaned prior to reinstallation in the false ceiling, this dust and debris continues to accumulate or can become airborne, creating health and environmental concerns. Therefore, yet another need exists to encase the entire ceiling tile, covering both the front and back surfaces and sealing the ceiling tile about its perimeter. Further, ceiling tiles can become misaligned if bumped or not correctly positioned in the false ceiling. Therefore, another need exists for a flap around the perimeter of the ceiling tile to maintain its position in the false ceiling.

Methods to resurface ceiling tiles have been used in the past, including the following:

| Inventor | Pat. No. | Issue Date |
| --- | --- | --- |
| Muller | 3,398,811 | Aug. 27, 1968 |
| Thompson | 3,551,232 | Dec. 29, 1970 |
| Hirano et al. | 3,912,542 | Oct. 14, 1975 |
| Halls | 4,666,540 | May 19, 1987 |
| Halls et al. | 4,894,102 | Jan. 16, 1990 |
| Takahashi | 5,080,742 | Jan. 14, 1992 |
| Evans et al. | 5,123,985 | Jun. 23, 1992 |
| Copeland | 5,277,743 | Jan. 11, 1994 |
| Itoyama et al. | 6,007,650 | Dec. 28, 1999 |

Muller discloses a method to cover a tile with a heat-softened thermoplastic sheet drawn into the fissures of the surface of the tile by a vacuum. The sheet is then loosened from the surface of the tile after cooling by a vacuum. The membrane is adhesively attached to the tile along the edges prior to or during the application of the vacuum.

Thompson discloses a method of vacuum-forming laminated articles. An adhesive layer is sprayed on the top surface of the substrate and a textured vinyl skin is heat softened and applied over the adhesive layer as the cover layer. The edges of the sheet are manually tucked under the edges of the substrate.

Hirano et al. disclose a method of producing a laminated sheet-like material.

Halls discloses a method and apparatus for on-site repair and refinishing of building panels. The panel is sprayed with adhesive, a sheet of decorative material is attached, and the panel is then run through pinch rollers.

Halls et al. disclose a method and apparatus of refinishing a panel. The panel is placed on a support surface having a plurality of perforations so that the back surface of the panel is in contact with the perforated support surface. An adhesive is applied to one side of an air-impervious sheet and the sheet is placed over the panel. A vacuum is drawn between the sheet and the perforated support surface to collapse the sheet tightly against the surface so that it substantially conforms to the contour of the panel surface.

Takahashi discloses an improvement for manufacture of a core body covered with a flexible plastic sheet using a mold with a vacuum chamber.

Evans et al. disclose a vacuum bag that readily conforms to the surface contour of the work piece at low pressures without failure.

Copeland discloses a panel sealing system for heat sealing a plastic layer to a panel member. The panel members are heat sealed by a continuous closed-cell coating.

Itoyama et al. disclose a vacuum laminating apparatus and method. The material to be laminated is placed in a laminating space formed by a base member, a tube and flexible lid member and the material is heated while a vacuum is created in the space.

3. Solution to the Problem

None of the prior art references discussed above show a method to resurface a ceiling tile in which the entire ceiling tile is encased and a flap is formed about the perimeter of the ceiling tile. The method of the present invention encases the entire ceiling tile. That is, a facing covers the front surface of the ceiling tile and a backing covers the back surface of the ceiling tile. The facing and the backing extend beyond the edges about the perimeter of the ceiling tile and adhere together to form a flap that seals the perimeter of the ceiling tile. In addition, the flap that is formed by the overlap of the facing and the backing maintains the position of the ceiling tile in the false ceiling. Furthermore, overlapping the facing and the backing in the method of the present invention reduces the need for dimensional accuracy and the extra step of wrapping the edge of the facing and backing about the ceiling tile is eliminated.

SUMMARY OF THE INVENTION

The present invention is a method for encasing a broken or used ceiling tile in a fresh facing and a fresh backing. The back surface of the ceiling tile to be resurfaced is positioned adjacent to a vacuum table and an air-permeable facing is placed over the front surface of the ceiling tile so that the facing overlaps each edge about the perimeter of the ceiling tile. When an air-permeable facing is used, the facing is also covered with an air-impermeable cover to facilitate the step of drawing the facing onto the ceiling tile by vacuum. Preferably, a support frame is placed surrounding the ceiling tile to provide support for the facing that overlaps about the perimeter of the ceiling tile. A vacuum is applied through the vacuum table to draw the facing onto the ceiling tile until it adheres to the ceiling tile. The ceiling tile is then flipped over so the front surface of the ceiling tile is positioned adjacent to the vacuum table. An air-impermeable backing is placed over the ceiling tile so that the backing extends beyond the perimeter of the ceiling tile. The vacuum is once again applied through the vacuum table to draw the backing onto the ceiling tile until it adheres to the ceiling tile. The backing also adheres to the facing to form a flap about the perimeter of the ceiling tile. The flap can be formed near the front surface or near the back surface. As such, the ceiling tile is encased between the facing and the backing and sealed about its perimeter by the flap. The support frame can then be used as a guide to cut the flap to the desired dimensions. In one embodiment, a source of heat such as a heat lamp can be used to apply heat to the facing and the backing while the vacuum is applied to facilitate adhesion of the facing and the backing to the ceiling tile.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 3 is a cross-sectional side view of the resurfaced ceiling tile of FIG. 2 shown positioned in a false ceiling.

FIG. 4(a) is a cross-sectional side view of a ceiling tile to be resurfaced using the method of the present invention positioned with the back surface adjacent to a vacuum table.

FIG. 4(b) shows the ceiling tile of FIG. 4(a) as a vacuum is applied to draw a facing onto the ceiling tile.

FIG. 4(c) shows the ceiling tile of FIG. 4(b) positioned with the front surface adjacent to the vacuum table.

FIG. 4(d) shows the ceiling tile of FIG. 4(c) as a vacuum is applied to draw a backing onto the ceiling tile.

DETAILED DESCRIPTION OF THE INVENTION

Figure 1:
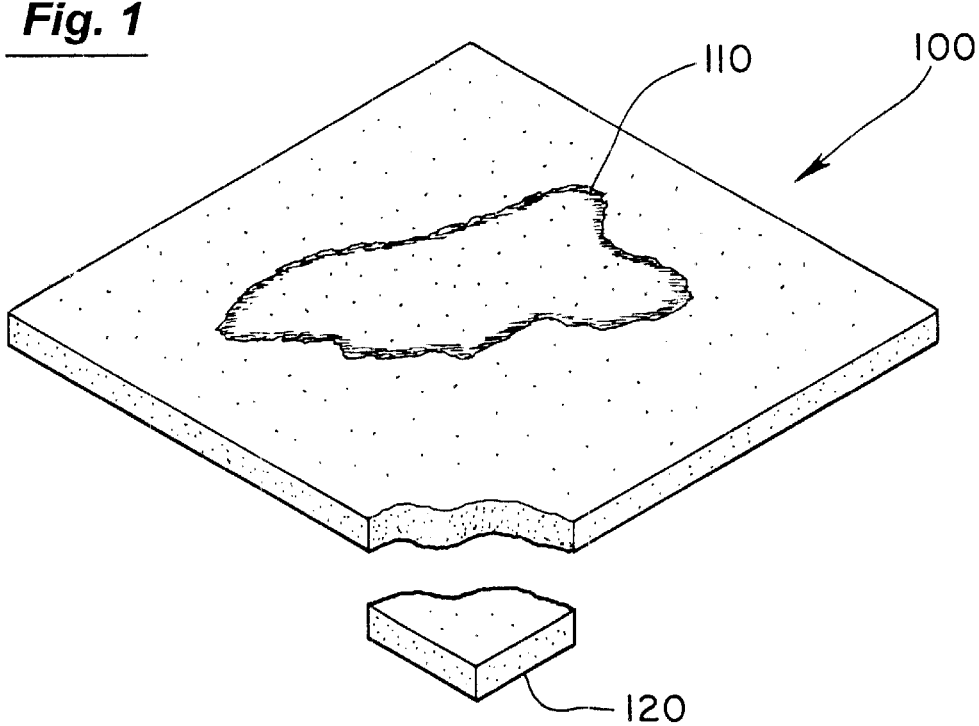
FIG. 1 is a perspective view of a ceiling tile to be resurfaced using the method of the present invention.
Figure 2:
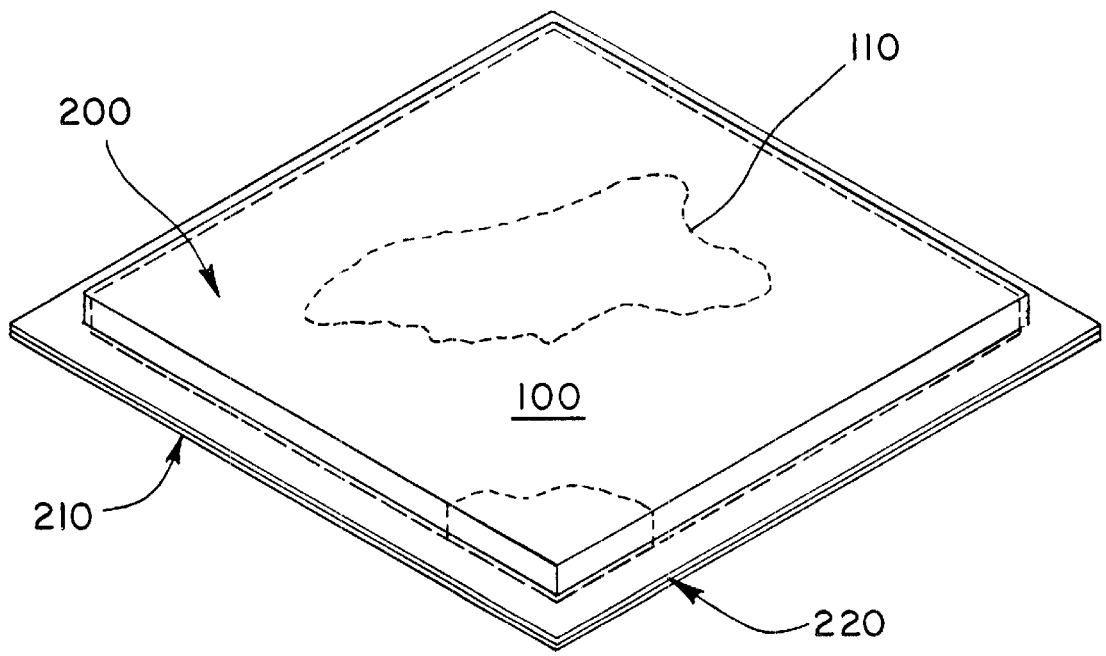
FIG. 2 is a perspective view of the ceiling tile of FIG. 1 after it has been resurfaced using the method of the present invention.

FIG. 1 shows a ceiling tile 100 with a stain 110 and a broken corner 120. The ceiling tile 100 can be an old ceiling tile that has become stained and broken during use, or a new ceiling tile that was stained or broken during the manufacturing process. In any event as shown in FIG. 2, the ceiling tile 100 can be resurfaced or encased between a fresh facing 200 and a fresh backing 210 using the method of the present invention. As such, the stain 110 is no longer visible and the broken corner 120 is held in place by the facing 200 and the backing 210. Furthermore, any dust or debris need not be cleaned off and is no longer visible nor a threat of becoming airborne once the ceiling tile 100 is encased. In addition, a flap 220 is formed about the perimeter of the ceiling tile 100 by the adhesion of the facing 200 to the backing 210. The flap 220 seals the edges to completely encase the ceiling tile 100. In addition, the flap 220 maintains the position of the encased ceiling tile 100 in the false ceiling, as shown in FIG. 3. That is, the encased ceiling tile 100 is pushed past the support railing 300 of the false ceiling. The flap 220 is sufficiently flexible that the encased ceiling tile 100 is readily pushed past the support railing 300 and once in the false ceiling, rests on the support railing 300. Once the encased ceiling tile 100 has been positioned in the false ceiling, the flap 220 abuts the support railing 300 and maintains the position of the encased ceiling tile 100 relative to the support railing 300.

FIGS. 4(a) through 4(d) illustrate a preferred embodiment of the method of the present invention. In FIG. 4(a), the ceiling tile 100 to be resurfaced is placed on a vacuum table 400 with the back surface 410 adjacent to or abutting the vacuum table 400. For example, the vacuum table can be constructed by placing a rigid sheet of perforated material (e.g., masonite) over a plenum connected to a blower that maintains reduced air pressure within the plenum and draws in air through the perforations.

Optionally, a support frame 420 can be placed surrounding the ceiling tile 100 to provide support for the facing 200 (i.e., to hold the facing 200 level with the front surface 415 of the ceiling tile 100 when the vacuum is applied). A facing 200 is then placed over the ceiling tile 100 so that the facing 200 overlaps each edge about the perimeter of the ceiling tile 100. An adhesive is applied between the facing 200 and the ceiling tile 100. The adhesive can be applied directly to the ceiling tile 100, to the facing 200, or can be pre-applied to the facing 200 (i.e., during manufacture of the facing 200 and exposed by removing a cover strip), etc. It is understood that the adhesive can be any conventionally available adhesive (e.g., liquid, heat-activated, etc.).

Preferably, the facing 200 is made of a porous or air-permeable material. In an alternative embodiment, the facing 200 can be made of an air-impermeable material. However, where the facing 200 is made of an air-permeable material, an air-impermeable cover 440 is positioned over the facing 200 to facilitate drawing the facing 200 onto the ceiling tile 100 when a vacuum is applied, as shown in FIG. 4(b).

In FIG. 4(b), a vacuum indicated by arrows 450 is applied through the vacuum table 400. The vacuum draws the facing 200 onto and against the front surface 415 of the ceiling tile 100. The vacuum is maintained until the adhesive cures sufficiently that the facing 200 adheres to the front surface 415 of the ceiling tile 100. Applying a vacuum ensures that the entire facing 200 adheres to the entire front surface 415 of the ceiling tile 100, and conforms substantially to the shape of the ceiling tile 100 (i.e., to pores 460 in the ceiling tile 100).

Once the facing 200 adheres to the front surface 415 of the ceiling tile 100, the vacuum is shut down and the ceiling tile 100 is positioned with the front surface 415 abutting or adjacent to the vacuum table 400, As shown in FIG. 4(c). A backing 210 is placed over the back surface 410 of the ceiling tile 100. The ceiling tile 100 need not be cleaned and debris can remain on the back surface 410 to be encased with the ceiling tile 100. Preferably, the backing 210 is air-impermeable (e.g., foil), however, where an air-permeable backing is used, an air-impermeable cover (not shown) can be used over the backing 210 to enhance the effect of the vacuum.

In one embodiment, an air-impermeable cover 455 is placed between the facing 200 and the vacuum table 400 beneath the ceiling tile 100 so that when a vacuum is applied, the facing 200 is protected and does not pull apart from the front surface 415 of the ceiling tile 100. The air-impermeable cover 455 does not extend as far beyond the periphery of the ceiling tile 100 as the backing 210. When a vacuum is applied, air is withdrawn through the gap about the periphery of the ceiling tile 100 between the edges of the backing 210 and the edges of the air-impermeable cover 455. As a result, the backing 210 is drawn onto the back surface 410 of the ceiling tile 100, as shown in FIG. 4(d). Again, any suitable adhesive can be applied between the backing 210 and the back surface 410 of the ceiling tile 100 to bond the backing 210 to the ceiling tile 100.

In FIG. 4(d), a vacuum indicated by arrows 445 is applied through the vacuum table 400 to draw the backing 210 onto the back surface 410 of the ceiling tile 100 and also draw the backing 210 onto the facing 200 where each extends beyond the periphery of the ceiling tile 100 to form the flap 220. As such, the ceiling tile 100 is encased not only with a fresh facing 200 and a fresh backing 210, but also sealed around its perimeter.

There are a number of alternative approaches that can be used to withdraw air from between the facing 200 and backing 210 in the step described above. For example, one or more small slots be can cut inward from the periphery of the facing 200 to create air passageways from the vacuum table to the periphery of the ceiling tile 100 beneath the backing 210. The slots extend only into those peripheral portions of the facing 200 that become part of the flap 220. In another embodiment, one or more tubular members are used to create air passageways leading from individual holes in the surface of the vacuum table to the edge of the ceiling tile 100 beneath the backing 210 and above the facing 200. Semi-circular channels can be substituted for this purpose.

It should be expressly understood that the flap 220 can be formed at either edge of the ceiling tile 100 (i.e., near the back surface 410 or near the front surface 415). Indeed, the flap 220 can be formed anywhere along the perimeter between the two edges of the ceiling tile 100. In any event, the flap 220 will function to seal the ceiling tile about the perimeter. In addition, the flap 220 can vary in size depending on design considerations such as the space between the ceiling tile 100 and the support railing 300 once the ceiling tile 100 is inserted into the false ceiling. The flap 220 also allows for dimensional inaccuracies. That is, the facing 200 and the backing 210 need not align with the edges of the ceiling tile 100 nor with each other. Once the ceiling tile 100 is encased, the facing 200 and backing 210 can be trimmed to the desired size using any suitable cutting device. Indeed, the support frame 420 can also serve as a guide for trimming the facing 200 and the backing 210.

A source of heat (not shown), such as a heat lamp, can be used to apply heat to the facing 200 and the backing 210, respectively, while the vacuum is applied. Use of the source of heat speeds the time it takes for the facing 200 and the backing 210 to adhere to the ceiling tile 100.

It is to be expressly understood that the method discussed above with respect to FIGS. 4(a) through 4(d) is merely illustrative of the present invention and that other embodiments are possible under the teachings of the present invention. For example, the steps described above can occur in a different order such as applying the backing 210 before applying the facing 200 to the ceiling tile 100, an air-impermeable facing (not shown) can be used and hence the steps involving the air-impermeable cover 450 can be eliminated altogether, the support frame 420 need not be used, etc.

Alternatively, the present invention could be practiced without the benefit of a vacuum table to draw the facing 200 and backing 210 onto the ceiling tile 100. For example, the facing 200 and backing 210 can be bonded to the ceiling tile 100 and to one another about their periphery by means of adhesive or thermal bonding. External pressure can be applied to the facing 200 and backing 210 by means of a weight, press, roller, positive air pressure, or the like, to help ensure that the facing 200 and backing 210 intimately bond to the surfaces of the ceiling tile 100.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted by the prior art.

I claim:

1. A method for encasing a ceiling tile comprising the steps of:

positioning a back surface of a ceiling tile adjacent to a vacuum table;

framing the ceiling tile;

placing an air-permeable facing over a front surface of the ceiling tile with the facing extending beyond the perimeter of the ceiling tile and being supported by the framing;

covering the facing with an air-impermeable cover;

drawing the facing onto the ceiling tile with a vacuum applied through the vacuum table;

positioning the front surface of the ceiling tile adjacent to the vacuum table;

placing an air-impermeable backing over the ceiling tile, said backing extending beyond the perimeter of the ceiling tile;

drawing the backing onto the ceiling tile with the vacuum applied through the vacuum table, whereby the ceiling tile is encased between the facing and backing, and the backing and facing further form a flap that seals about the perimeter of the ceiling tile.

2. The method of claim 1 further comprising the step of heating the facing and backing when vacuum is applied.

3. The method of claim 1 further comprising the step of cutting the facing and backing about the ceiling tile.

* * * * *